(12) United States Patent
Goto et al.

(10) Patent No.: US 10,332,402 B2
(45) Date of Patent: Jun. 25, 2019

(54) MOVEMENT ASSISTANCE SYSTEM AND MOVEMENT ASSISTANCE METHOD

(71) Applicant: TOYOTA JIDOSHA KABUSHIKI KAISHA, Toyota-shi, Aichi-ken (JP)

(72) Inventors: Jun Goto, Toyota (JP); Takenori Shimizu, Inuyama (JP); Naoki Kurokawa, Tokyo-to (JP); Junya Watanabe, Shizuoka-ken (JP); Koji Kawasaki, Anjo (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/156,398

(22) Filed: Oct. 10, 2018

(65) Prior Publication Data
US 2019/0114922 A1 Apr. 18, 2019

(30) Foreign Application Priority Data
Oct. 12, 2017 (JP) ................. 2017-198390

(51) Int. Cl.
*G08G 1/16* (2006.01)
*G01C 21/36* (2006.01)
(Continued)

(52) U.S. Cl.
CPC .......... *G08G 1/166* (2013.01); *B60Q 1/2661* (2013.01); *B60Q 1/54* (2013.01); *G01C 21/365* (2013.01);
(Continued)

(58) Field of Classification Search
CPC ....... G08G 1/163; G08G 1/166; B60W 30/09; B60W 30/0956; B60Q 1/2661;
(Continued)

(56) References Cited

U.S. PATENT DOCUMENTS

2006/0229804 A1* 10/2006 Schmidt ............... G05D 1/0278
701/466
2014/0062685 A1 3/2014 Tamatsu et al.
(Continued)

FOREIGN PATENT DOCUMENTS

CN 106956266 A 7/2017
GB 2531084 A 4/2016
(Continued)

OTHER PUBLICATIONS

Mario Wassilikos: "Sicherheit - Musikkapellen auf öffentlichen Verkehrsflächen", Blasmusik, May 31, 2016, pp. 18-19, XP055558602, Retrieved from the Internet: URL:http://obj2.peak.at/files/0eBZ _0516 _jugend.pdf [retrieved on Feb. 19, 2019] * p. 18-p. 19.
(Continued)

*Primary Examiner* — An T Nguyen
(74) *Attorney, Agent, or Firm* — Hunton Andrews Kurth LLP

(57) ABSTRACT

A school-travel assistance system includes automobiles. The automobiles include communication modules configured to communicate with each other, and are configured to perform auto-driving. At least one of the automobiles includes a camera configured to detect the group of children. The automobiles perform assistance control (first and second assistance controls) in which they cooperatively assist movement of the group of children, while communicating with each other through the communication modules. The assistance control is control of assisting the movement of the group of children by the automobile traveling in front of the group of children and the automobile traveling behind the group of children.

8 Claims, 7 Drawing Sheets

(51) Int. Cl.
  *B60Q 1/26* (2006.01)
  *G05D 1/02* (2006.01)
  *B60Q 1/54* (2006.01)
  *G01S 17/93* (2006.01)

(52) U.S. Cl.
  CPC .......... *G05D 1/0234* (2013.01); *G01S 17/936* (2013.01); *G08G 1/163* (2013.01)

(58) Field of Classification Search
  CPC ...... B60Q 1/54; G01C 21/365; G05D 1/0234; G01S 17/936
  See application file for complete search history.

(56) References Cited

U.S. PATENT DOCUMENTS

| | | | |
|---|---|---|---|
| 2015/0336502 A1 | 11/2015 | Hillis et al. | |
| 2017/0287332 A1* | 10/2017 | Ranninger Hernandez | G08G 1/005 |
| 2017/0369055 A1* | 12/2017 | Saigusa | G08G 1/096791 |
| 2018/0326901 A1* | 11/2018 | Boyle | B60Q 1/503 |

FOREIGN PATENT DOCUMENTS

| | | |
|---|---|---|
| JP | 2003340764 A | 12/2003 |
| JP | 2007102488 A | 4/2007 |
| JP | 2011204142 A | 10/2011 |
| JP | 2012247369 A | 12/2012 |
| JP | 2014046838 A | 3/2014 |
| JP | 2014184876 A | 10/2014 |
| JP | 2015069594 A | 4/2015 |
| JP | 2015179414 A | 10/2015 |
| JP | 2015191355 A | 11/2015 |
| JP | 2016090318 A | 5/2016 |
| JP | 2017124821 A | 7/2017 |
| WO | 2018/210109 A1 | 11/2018 |

OTHER PUBLICATIONS

Extended European Search Report in counterpart EP Application No. 18198800.7 issued on Mar. 4, 2019 from the European Patent Office, 9 pages.

* cited by examiner

MOVEMENT ASSISTANCE SYSTEM AND MOVEMENT ASSISTANCE METHOD

This nonprovisional application is based on Japanese Patent Application No. 2017-198390 filed on Oct. 12, 2017 with the Japan Patent Office, the entire contents of which are hereby incorporated by reference.

BACKGROUND

Field

The present disclosure relates to a movement assistance system and a movement assistance method, and, more particularly, to a movement assistance system and a movement assistance method for assisting the movement of a group including a plurality of users.

Description of the Background Art

In recent years, services are proposed in which an automobile capable of auto-driving is run without a driver (i.e., directed to auto-transit) and the auto-transit automobile is allocated to a user upon a user request. However, depending on regions or the time of day, demand and supply for the auto-transit automobiles are not necessarily balanced, and oversupply of the auto-transit automobiles can occur. In light of such a circumstance, application of the auto-transit automobiles for other purposes as well (purposes other than for movement of users) is considered.

For example, Japanese Patent Laying-Open No. 2017-124821 discloses applying a pattern of white and black stripes onto the exterior of an automobile capable of auto-driving, thereby making the automobile appear to suspects as if it is a patrol car (e.g., see claim 14 and paragraph [0073] of Japanese Patent Laying-Open No. 2017-124821).

SUMMARY

Instead of a user getting onboard an automobile that is auto-transiting, it is also considered to apply the automobile capable of auto-transit for assisting a user in moving (walking). As one example, it is considered to apply such an automobile as a movement assistance system (i.e., a child watch system) for allowing children to go to school safely.

The present disclosure is made to solve the above problem, and has an object to provide a technology which allows assisting appropriately the movement of a group including users.

(1) The movement assistance system according to a certain aspect of the present disclosure assists the movement of a group including a plurality of users. The movement assistance system includes a first vehicle and a second vehicle. The first vehicle and the second vehicle are each configured to perform auto-driving. At least one of the first vehicle and the second vehicle includes a detection device configured to detect the group. The first vehicle and the second vehicle perform an assistance control in which the first vehicle and the second vehicle cooperatively assist the movement of the group. The assistance control assists the movement of the group by the first vehicle traveling in front of the group and the second vehicle traveling behind the group.

(2) The first vehicle and the second vehicle may include transceivers. The first vehicle and the second vehicle communicate with each other via the transceivers, thereby performing the assistance control.

According to the above configurations (1) and (2), the group of users (such as children) on the move are placed in between the first vehicle and the second vehicle in the front-to-back direction. This allows the group of children to move to a destination (such as a school) while gathering together to some extent. Thus, the movement of the group of users can be assisted appropriately.

(3) The first vehicle and the second vehicle may perform the assistance control when the current time is within a predetermined time period for the movement of the group.

According to the above configuration (3), the assistance control service can be provided in a time period (e.g., time period in which children are on a way to school) where users are required (need) to move in a group.

(4) The first vehicle and the second vehicle each may further include an information acquisition device which obtains the current location information and information about a path of movement of the group. As the current time enters the predetermined time period, the first vehicle and the second vehicle travel to the path of movement of the group and perform the assistance control.

According to the above configuration (4), the first vehicle and the second vehicle travel to the path of movement of the group of users and meet up with the group of users on the path, thereby allowing the first vehicle and the second vehicle and the group to smoothly join together.

(5) When a distance between the first vehicle and the second vehicle is greater than a given distance, the first vehicle may reduce the travel speed of the first vehicle lower than when the distance is shorter than the given distance.

According to the above configuration (5), the first vehicle lowering the travel speed (slowing down) makes a user (closer to the first vehicle) in the front of the group slow down the walking speed, thereby allowing a user in the back of the group to catch up with the user in the front. As a result, misalignment of the group of users in the front-to-back direction can be inhibited.

(6) The second vehicle may further include a notification device configured to notify the group of a walking zone on the path of movement of the group. (7) Moreover, the notification device may include a projector configured to project the walking zone onto a road surface.

According to the above configurations (6) and (7), the group of users can be appropriately guided by, for example, notifying, by the notification device, the group of users to walk on the left side of the path of movement. Moreover, the group of users walking within the walking zone projected on the road surface can also prevent misalignment of the group in the left-to-right direction (direction perpendicular to the direction of movement).

(8) The second vehicle may cause the projector to modify the shape of the walking zone projected on the road surface according to a condition of the path of movement of the group.

According to the above configuration (8), for example, when the first vehicle is about to turn a corner, the second vehicle modifies the shape of the walking zone in conformity to the corner. Also, when there is an obstacle in front of the first vehicle and the first vehicle is traveling, avoiding the obstacle, the second vehicle modifies the shape of the walking zone according to the path of travel of the first vehicle (and the walking path for the following user). This can more suitably form the walking zone that is desirable for the users to move within.

(9) The movement assistance method according to other aspects of the present disclosure assists movement of a group including users, using the first vehicle and the second vehicle. The first vehicle and the second vehicle are each configured to perform auto-driving. At least one of the first vehicle and the second vehicle is configured to detect the group. The movement assistance method includes: detecting the group by at least one of the first vehicle and the second vehicle; and assisting the movement of the group by the first vehicle and the second vehicle cooperating with each other, the first vehicle traveling in front of the group and the second vehicle traveling behind the group.

According to the above method (9), as with the configuration (1), the movement of the group of users can be assisted appropriately.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment according to the present disclosure is described in detail, with reference to the accompanying drawings. Note that the same reference signs are used to refer to the same or like parts, and the description will not be repeated.

A "movement assistance system" according to the present disclosure assists movement of a group of users which includes multiple users. In the following embodiment, an example is described where the "movement assistance system" according to the present disclosure is used as a "school-travel assistance system" which assists the group of children in going to school. However, attributes of users who are assisted are not particularly limited, and may be, for example, elderly, persons with disabilities, etc. Alternatively, the "movement assistance system" according to the present disclosure is available also for the purposes of guiding visitors to a destination in facilities (e.g., in tourist attractions, leisure facilities), for example.

Embodiment

<Overall Configuration of School-Travel Assistance System>

Figure 1:
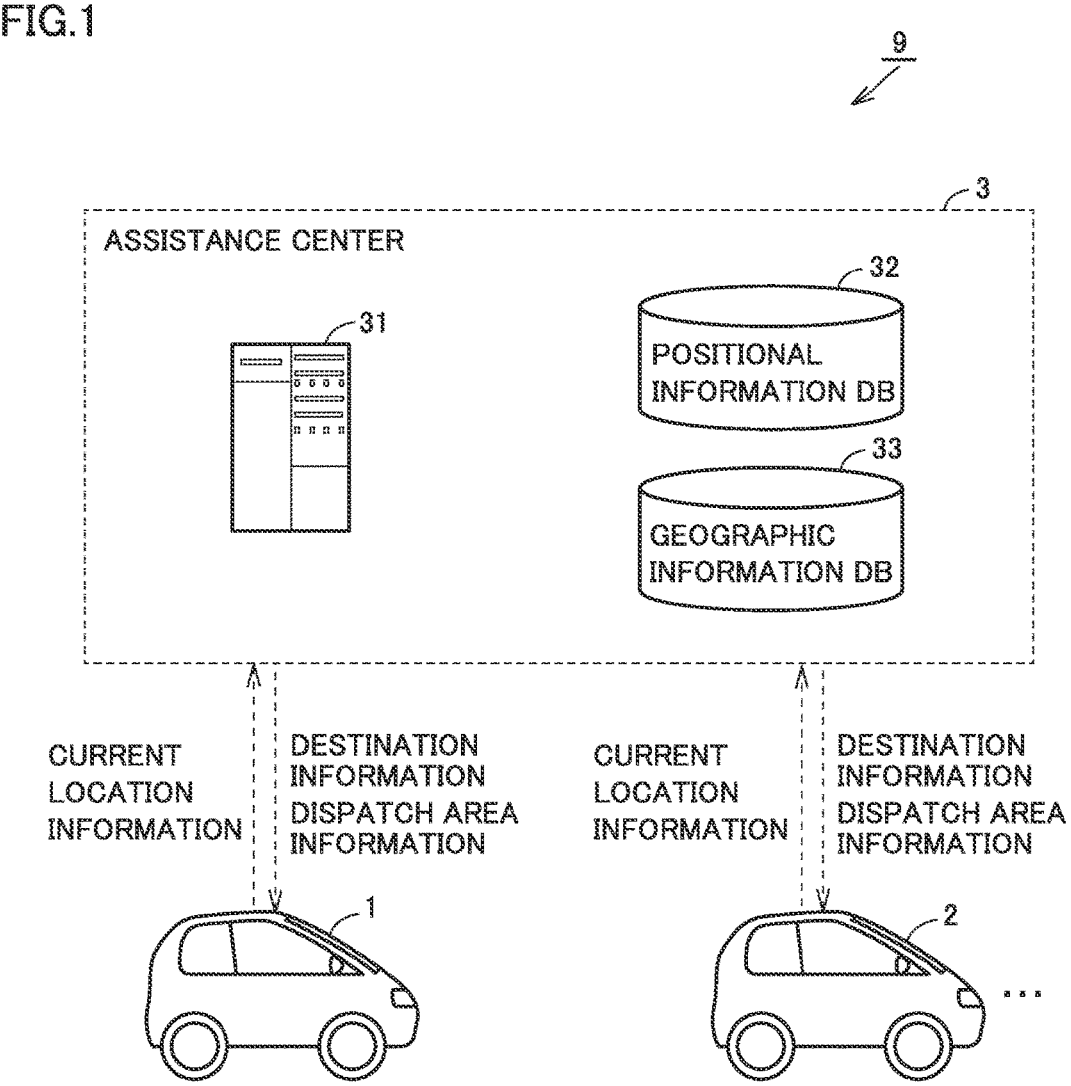
FIG. 1 is a diagram schematically showing an overall configuration of a school-travel assistance system according to an embodiment.

FIG. 1 is a diagram schematically showing an overall configuration of the school-travel assistance system according to the present embodiment. Referring to FIG. 1, school-travel assistance system 9 includes multiple automobiles including automobiles 1 and 2, and an assistance center 3.

Each of automobiles 1 and 2 is, for example, a single-occupancy electric vehicle configured to perform auto-driving (automated driving). However, automobiles 1 and 2 may be those equipped with engines (hybrid vehicles, what is called conventional vehicles). Automobiles 1 and 2 are not limited to four-wheeled vehicles, and may be two-wheeled vehicles or three-wheeled vehicles, for example. The seating capacity for automobiles 1 and 2, too, is not particularly limited. Further, while automobiles 1 and 2 each correspond to a "vehicle" according to the present disclosure, the "vehicle" according to the present disclosure may not be capable of carrying a user so long as it is capable of moving, and may be a robot, for example.

Note that the auto-driving means control in which driving operations of automobiles 1 and 2, such as speeding up and down and steering of automobiles 1 and 2, are performed, independent of driving operations by drivers of automobiles 1 and 2. The auto-driving includes, for example, lane keeping control and cruise control. In the lane keeping control, hand wheels (not shown) of automobiles 1 and 2 are automatically steered so that automobiles 1 and 2 travel along driving lanes without moving out of the driving lanes. In the cruise control, for example, if there is no automobile ahead of automobiles 1 and 2, constant-speed control is performed which automatically drives automobiles 1 and 2 at a pre-set constant speed, whereas if there is an automobile ahead of automobiles 1 and 2, follow-up control is performed which adjusts the speed of automobiles 1 and 2 according to the following distance between automobiles 1 and 2 and the vehicle ahead of them. If the "vehicle" is, for example, a robot, the "vehicle" may travel on a footpath.

For example, if automobiles 1 and 2 are shared automobiles (automobiles for car-sharing), automobiles 1 and 2 may perform the auto-transit to return to a pick-up and drop-off center after dropping off a user, or perform the auto-transit until carrying a user next time. As such, in the present embodiment, a situation is assumed where automobiles 1 and 2 are auto-transiting. Note that the auto-transiting is not limed to an automobile in motion, and the automobile may be at rest (e.g., being parked and on standby).

Assistance center 3 is configured to perform two-way communications with a large number of automobiles including automobiles 1 and 2. Assistance center 3 manages the traveling situation of each automobile, and transmits necessary information or instruction upon a request from the automobile. Assistance center 3 includes a server 31, a positional information database 32, a geographic information database 33, and a communication device (not shown).

Positional information database 32 collects positional information indicating the current location for each automobile, and stores the collected positional information. Geographic information database 33 stores road map data. Upon a request from the automobile, server 31 manages various information for indicating a destination of an automobile. Details of control by server 31 will be described later.

<Configuration of Automobile>

Automobiles 1 and 2 basically have a common configuration. Thus, in the following, a configuration of automobile 1 is described representatively.

Figure 2:
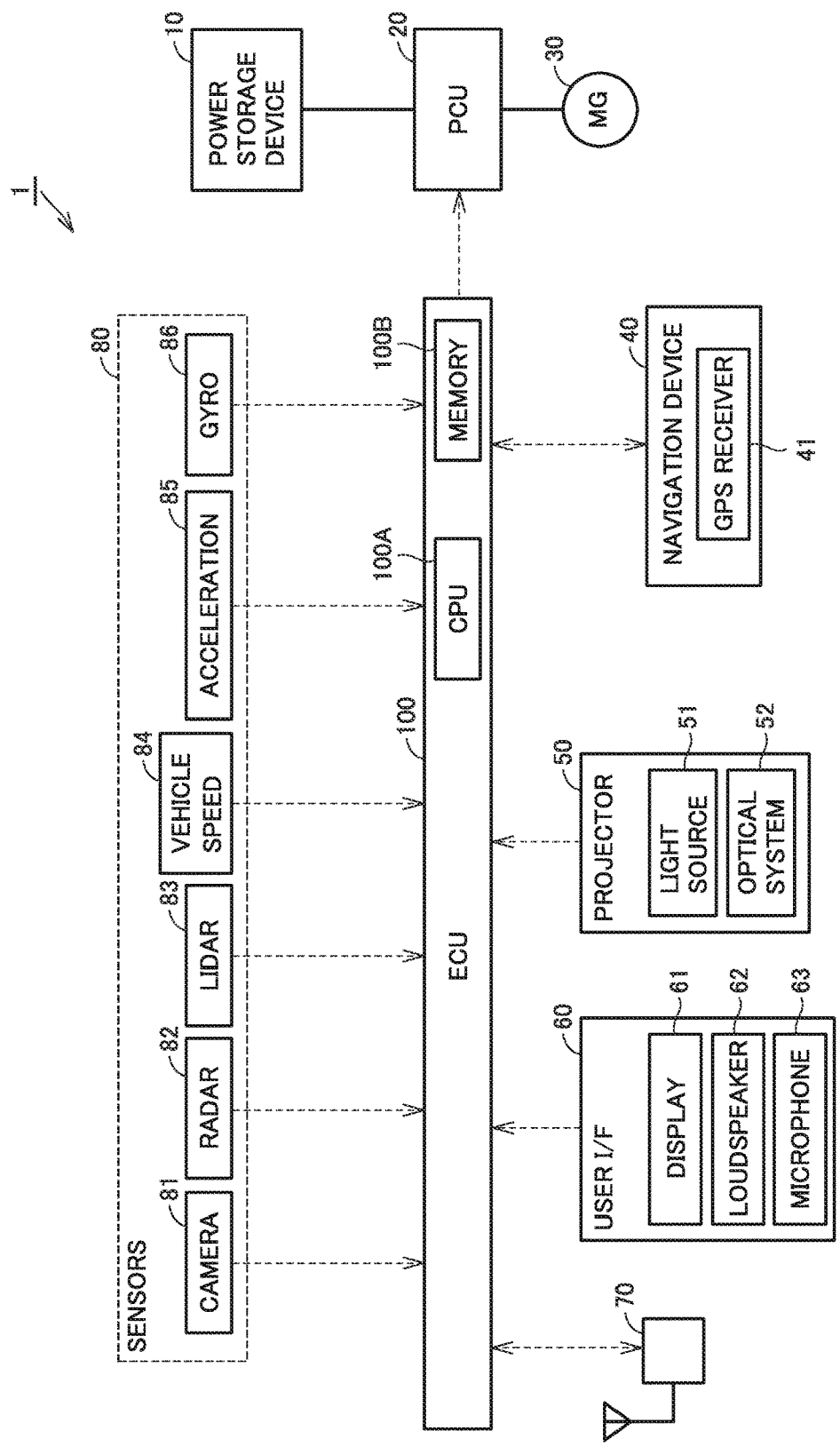
FIG. 2 is a diagram schematically showing a configuration of an automobile.

FIG. 2 is a diagram schematically showing a configuration of automobile 1. Referring to FIG. 2, automobile 1 includes a power storage device 10, a power control unit (PCU) 20, a motor generator (MG) 30, a navigation device 40, a user interface 60, a communication module 70, sensors 80, and an electronic control unit (ECU) 100.

Power storage device 10 is a rechargeable direct-current (DC) power supply, and includes a secondary battery, such as, a lithium-ion secondary battery or a nickel-metal hydride battery, for example. An electric double layer capacitor or the like may also be employed as power storage device 10. Power storage device 10 stores power which is supplied from an external power source via an inlet (none of which is shown). Power storage device 10 then supplies the stored power to PCU 20.

PCU 20 is under control of ECU 100, and converts power between power storage device 10 and motor generator 30. PCU 20 includes, for example, an inverter which receives the power from power storage device 10, and drives motor generator 30 using the power, and a converter which adjusts the level of a DC voltage to be supplied to the inverter.

Motor generator 30 is an alternating-current motor, an example of which is a permanent-magnet synchronous motor which includes a rotor having a permanent-magnet embedded therein. Motor generator 30 is driven by the inverter included in PCU 20, and drives a drive shaft (not shown). Moreover, during braking of the automobile, motor generator 30 receives a rotational force of driving wheels, and generates power. The power generated by motor generator 30 is stored into power storage device 10 via PCU 20.

Navigation device 40 includes a GPS receiver 41 for identifying the location of automobile 1, based on a radio wave from an artificial satellite (not shown). Navigation device 40 performs various navigation processes for automobile 1, using the positional information (GPS information, map information) of automobile 1 identified by GPS receiver 41. More specifically, navigation device 40 calculates a travel route (a route planned to travel or a target route) from the current location of automobile 1 to a destination, based on the GPS information for automobile 1 and the road map data which is stored in a memory (not shown), and outputs target route information to ECU 100.

A projector 50 includes a light source 51 and an optical system 52. A controller (not shown) included in projector 50 controls an actuator (not shown) so that a projection angle of the projector is adjusted, for example, based on a distance from the current location of automobile 1 to a corner and a vehicle speed V1 of automobile 1, and an image is thereby projected at the adjusted projection angle. The controller then causes projector 50 to project the image generated by light source 51 and optical system 52 onto a road surface (for details of a projector such as projector 50, see U.S. Patent Publication No. 2015/0336502, Japanese Patent Laying-Open No. 2014-184876, Japanese Patent Laying-Open No. 2016-090318, and Japanese Patent Laying-Open No. 2012-247369).

User interface 60 includes, for example, a display 61, a loudspeaker 62, and a microphone 63. Display 61 is, for example, a touch panel display, and displays various information and receives user manipulations. Loudspeaker 62 outputs an audio to a user in its perimeter. Microphone 63 obtains user's voice in its perimeter. Information obtained through user interface 60 is output to ECU 100.

Communication module (transceiver) 70 is an on-board data communication module (DCM), and configured to allow two-way data communications between ECU 100 and server 31 included in assistance center 3. Communication module 70 is also configured to allow vehicle-to-vehicle communications with other automobiles (such as automobile 2).

For example, sensors 80 detect conditions external to automobile 1, detect a status of travel of automobile 1, or detect operations (steering operation, acceleration, and breaking) of automobile 1. ECU 100 is configured to perform driverless driving (full driving automation) based on the various information detected (or obtained) by sensors 80. In other words, in auto-driving using sensors 80, neither a driver nor operations by a driver are necessary in all situations.

Sensors 80 include a camera 81, a radar 82, a lidar (laser imaging detection and ranging) 83, a vehicle speed sensor 84, an acceleration sensor 85, and a gyro sensor 86.

Camera 81 captures an image of the condition external to automobile 1, and outputs to ECU 100 the captured information about the condition external to automobile 1. Camera 81 is mounted at least on the rear side of automobile 1. However, camera 81 may be mounted on both the front and rear sides of automobile 1. While camera 81 is mounted at least on the front side of automobile 2, camera 81 may be mounted on both the front and rear sides of automobile 2. Further, camera 81 may be capable of capturing the full-perimeter (i.e., 360 degrees) of automobile 1 and mounted on top of automobile 1.

Radar 82 transmits a radio wave (e.g., millimeter wave) into the perimeter of automobile 1, and receives a radio wave reflected off an obstacle, thereby detecting the obstacle. Radar outputs, for example, the distance to the obstacle and the direction of the obstacle as obstacle information to ECU 100.

Lidar 83 transmits light (typically, ultraviolet light, visible light, or near infrared light) into the perimeter of automobile 1, and receives light reflected off an obstacle, thereby measuring a distance to the reflection point and detecting the obstacle. Lidar 83 outputs, for example, the distance to the obstacle and the direction of the obstacle as obstacle information to ECU 100.

Note that at least one of camera 81 and lidar 83 corresponds to a "detection device" according to the present disclosure. The "detection device" may further include radar 82.

Vehicle speed sensor 84 is mounted on, for example, a wheel or a drive shaft of automobile 1. Vehicle speed sensor 84 detects the rotational velocity of the wheel and outputs vehicle speed information, including the speed (vehicle speed V1) of automobile 1, to ECU 100.

Acceleration sensor 85 includes, for example, a longitudinal acceleration sensor which detects acceleration of automobile 1 in the front-to-back direction, and a lateral acceleration sensor which detects lateral acceleration of automobile 1. Acceleration sensor 85 outputs acceleration information about both the longitudinal and lateral accelerations to ECU 100.

Gyro sensor 86 detects an inclination of automobile 1 relative to the horizontal direction. Gyro sensor 86 outputs, to ECU 100, a result of the detection as inclination information about the path of travel of automobile 1.

ECU 100 includes a CPU (Central Processing Unit) 100A, a memory 100B, input/output ports (not shown) for inputting/outputting various signals. ECU 100 performs various control (such as lane keeping control, cruise control, vehicle-stop control) to achieve the auto-driving (including the auto-transit) of automobile 1, based on the road map information stored in the memory (not shown) included in navigation device 40, and input from sensors 80. For example, ECU 100 also transmits various information (such as the positional information of automobile 1) to server 31 or receives commands or notifications from server 31, via communication module 70. ECU 100 controls the actuator (not shown) included in projector 50 to project the image generated by projector 50 onto the road surface.

<School-Travel Assistance Control for Children>

A case is considered where an automobile capable of the auto-driving is run without a driver (directed to auto-transit) and the auto-transit automobile is allocated to a user upon a user request. However, depending on regions or the time of day, demand and supply for auto-transit automobiles are not necessarily balanced, and oversupply of auto-transit automobiles can occur. Thus, it is desired to utilize the auto-transit automobiles to improve the efficiency of the utilization thereof. In light of such a circumstance, automobiles 1 and 2 are used to assist children in going to and from a nearby school (children may go from school in a group) during a time period where they go from the school.

Figure 3:
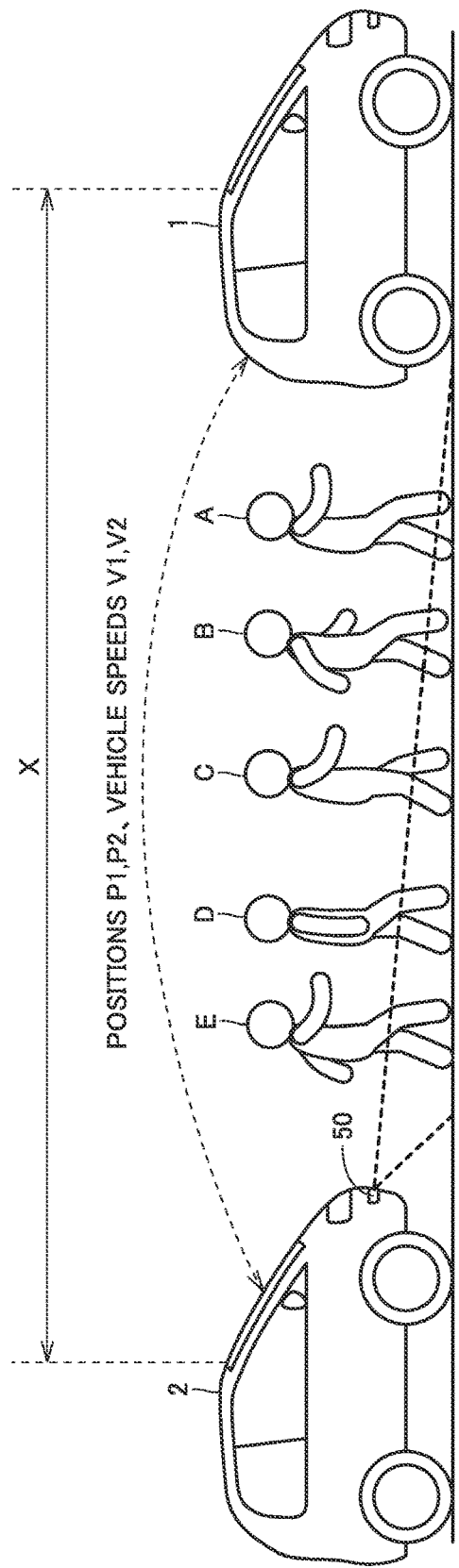
FIG. 3 is a diagram for schematically illustrating school-travel assistance control according to the embodiment.
Figure 4A:
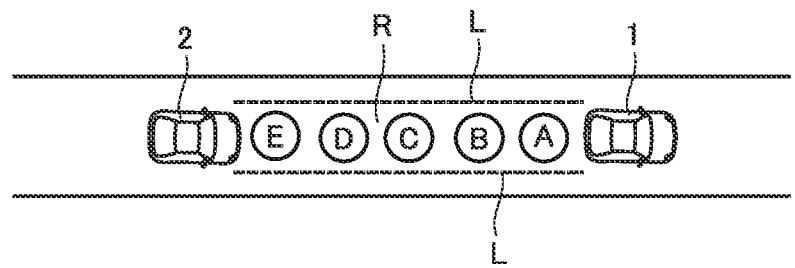
FIG. 4A is a top view (first diagram) of a situation shown in FIG. 3 where children are going to school.
Figure 4B:
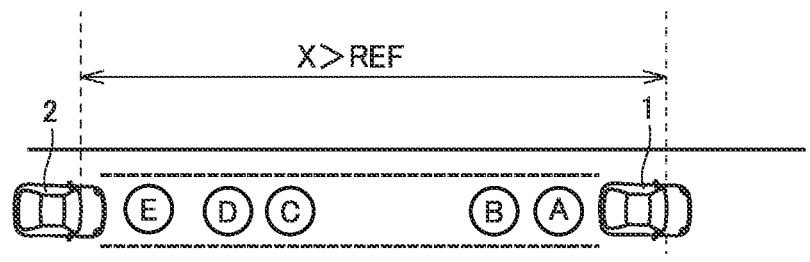
FIG. 4B is a top view (second diagram) of the situation shown in FIG. 3 where the children are going to school.
Figure 4C:
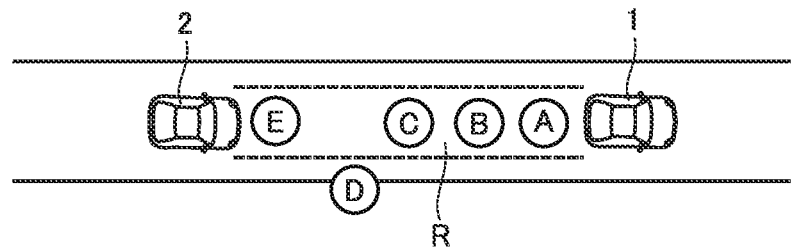
FIG. 4C is a top view (third diagram) of the situation shown in FIG. 3 where the children are going to school.

FIG. 3 is a diagram for schematically illustrating school-travel assistance control according to the present embodiment. FIGS. 4A to 4C are top views of the situation in which children are going to school as shown in FIG. 3. FIG. 3 and FIGS. 4A to 4C illustrate the situation in which a group including five children A, B, C, D, and E go to school, by way of example. However, the number of children is not particularly limited insofar as there are two or more children.

Referring to FIG. 3, automobile 1 transmits, to automobile 2, information indicating a position P1 of automobile 1, and information indicating vehicle speed V1 of automobile 1. Automobile 2, on the other hand, transmits information indicating a position P2 of automobile 2 and information indicating a vehicle speed V2 of automobile 2 to automobile 1. In other words, positional information (P1, P2) and the vehicle speed information (V1, V2) are shared between automobile 1 and automobile 2 through communications. Note that the communications may be performed directly between automobile 1 and automobile 2, or may be performed between automobile 1 and automobile 2 via server 31 included in assistance center 3.

Automobile 1 travels in front (ahead) of the group of children A to E, while detecting, by camera 81, the group of children, and guides children A to E to school (in this example, a destination for the group of children). Meanwhile, automobile 2 travels behind (to the tail end of) the group of children at vehicle speed V2 substantially equal to vehicle speed V1 of automobile 1, while detecting automobile 1 and the group of children in front of automobile 2 by camera 81.

The group of children are placed in between automobile 1 and automobile 2 as such, and thereby inhibiting misalignment (spreading out) of the group in the middle of the road to school. Thus, children A to E in the group can be securely accompanied to school. Note that automobile 1 corresponds to a "first vehicle" according to the present disclosure, and automobile 2 corresponds to a "second vehicle" according to the present disclosure.

Automobile 2, while having the group of children between automobile 2 and automobile 1, projects two light rays (projected light) L, using projector 50, onto a ground surface along the school road for the children, as shown in FIGS. 3 and 4A. The two light rays indicate a walking zone desired for children to walk within. All the children walking within the walking zone R enclosed by light rays L can also prevent misalignment of the group of children in the left-to-right direction (direction perpendicular to the direction of movement). Note that the walking zone may be indicated by illuminating the entire zone, instead of illumination with light rays L. Moreover, instead of the projections of light from projector 50, a laser beam from a laser light source (not shown) may be projected on a ground surface.

Automobiles 1 and 2 calculate spacing (inter-vehicle spacing) X between automobile 1 and automobile 2. Inter-vehicle spacing X can be calculated based on positional information (P1, P2) shared between automobile 1 and automobile 2. Alternatively, inter-vehicle spacing X can be estimated by, for example, capturing an image of one automobile by camera 81 onboard the other automobile and analyzing the image.

When inter-vehicle spacing X is greater than a reference distance REF as shown in FIG. 4B, that is, when the users in the group spread in the direction of travel, automobiles 1 and 2 perform control so that the spreading of the group is held back. More specifically, when inter-vehicle spacing X is greater than reference distance REF, automobile 1 in front reduces vehicle speed V1 lower than when inter-vehicle spacing X is less than or equal to reference distance REF. This slows down the walking speed of the preceding children (such as children A and B), allowing the following children (such as children D and E) to catch up with the preceding children. Note that automobile 2 behind may output, through loudspeaker 62, an audio message prompting the following children to catch up with the preceding children.

When one of children A to E (child D in the example shown in FIG. 4C) has stepped out of walking zone R, automobile 2 outputs, through loudspeaker 62, an audio message prompting the child to get back within walking zone R. This allows the group to revert to the state in which all children are staying within walking zone R.

Note that the automobile 2 may notify, through loudspeaker 62, the children by an audio output of the information indicating the walking zone desired for the children to pass along in going to school. For example, the automobile 2 may output an audio such as "please walk on the left side of the road here" through loudspeaker 62. Such information may also be displayed on display 61. In such a case, display 61 or loudspeaker 62 corresponds to a "notification device" according to the present disclosure.

The shape or direction of projection of walking zone R indicating a recommended path may be modified according to the shape of the school road or a condition of the school road.

Figure 5A:
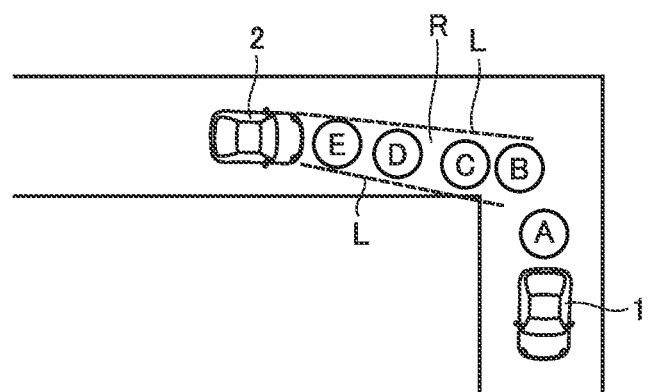
FIG. 5A is a diagram (first diagram) for illustrating changes in walking zone according to the shape or condition of a school road.
Figure 5B:
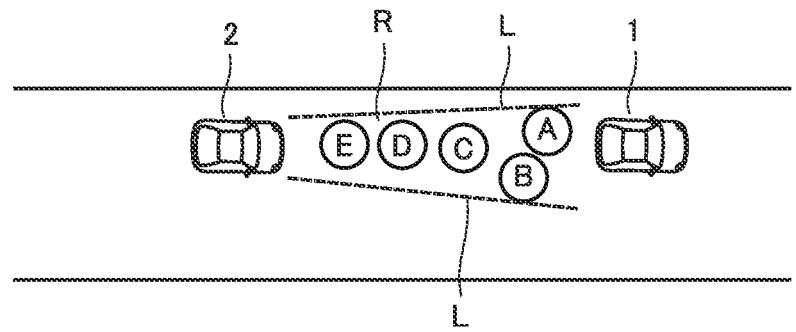
FIG. 5B is a diagram (second diagram) for illustrating changes in walking zone according to the shape or condition of the school road.

FIGS. 5A and 5B are diagrams for illustrating changes in walking zone R according to the shape or condition of the school road. For example, as shown in FIG. 5A, when automobile 1 (and following children) is about to turn a corner, automobile 2 may modify the shape (orientation and width) of the walking zone to conform to the shape of the corner. Although not shown, even when there is an obstacle in front of automobile 1, and automobile 1 is traveling, avoiding the obstacle, automobile 2 can modify the shape of the walking zone according to the path of travel of automobile 1 (and the walking path for the following children).

For example, on a school road having a width wider than a given width, two or more children may be allowed to walk abreast. On a school road having a width narrower than the given width, on the other hand, preferably, all children walk in a line so that their safety is ensured and they are out of the way of other passers. Therefore, automobile 2 is able to modify the width of walking zone R, according to a width of the school road, as shown in FIG. 5B.

<Flow of School-Travel Assistance Control>

Figure 6:
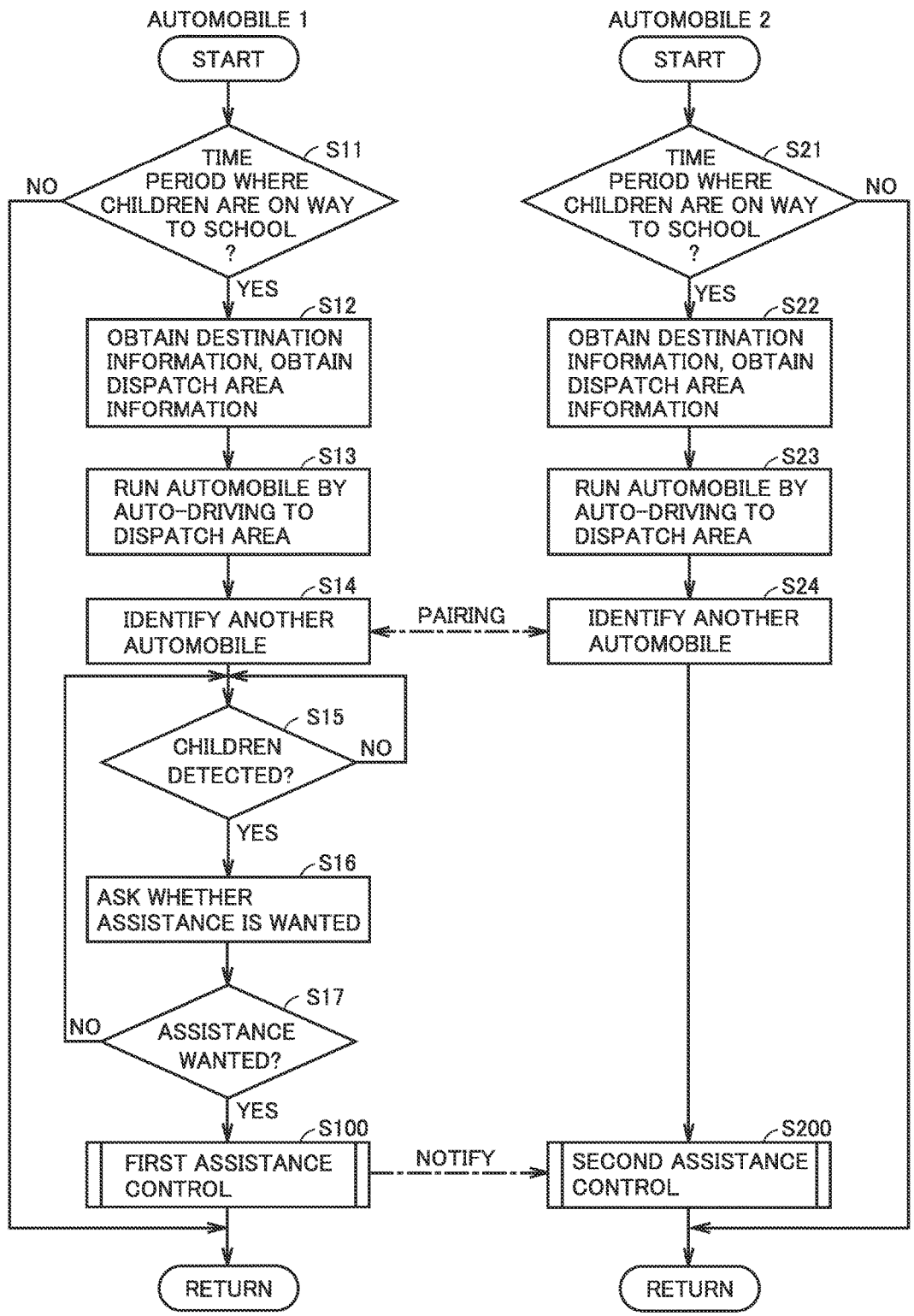
FIG. 6 is a flowchart for illustrating the school-travel assistance control according to the embodiment.

FIG. 6 is a flowchart for illustrating the school-travel assistance control according to the present embodiment. The respective steps illustrated in FIG. 6 and FIG. 7 described below (Hereinafter, abbreviated as "S") are implemented basically by software processing by the ECUs included in automobiles 1 and 2, but may be implemented by dedicated hardware (electric circuits) fabricated within the ECUs. Note that in the following, the ECU included in automobile 1 is referred to as an "ECU 101," and the ECU included in automobile 2 is referred to as an "ECU 102" to distinguish them.

Figure 7:
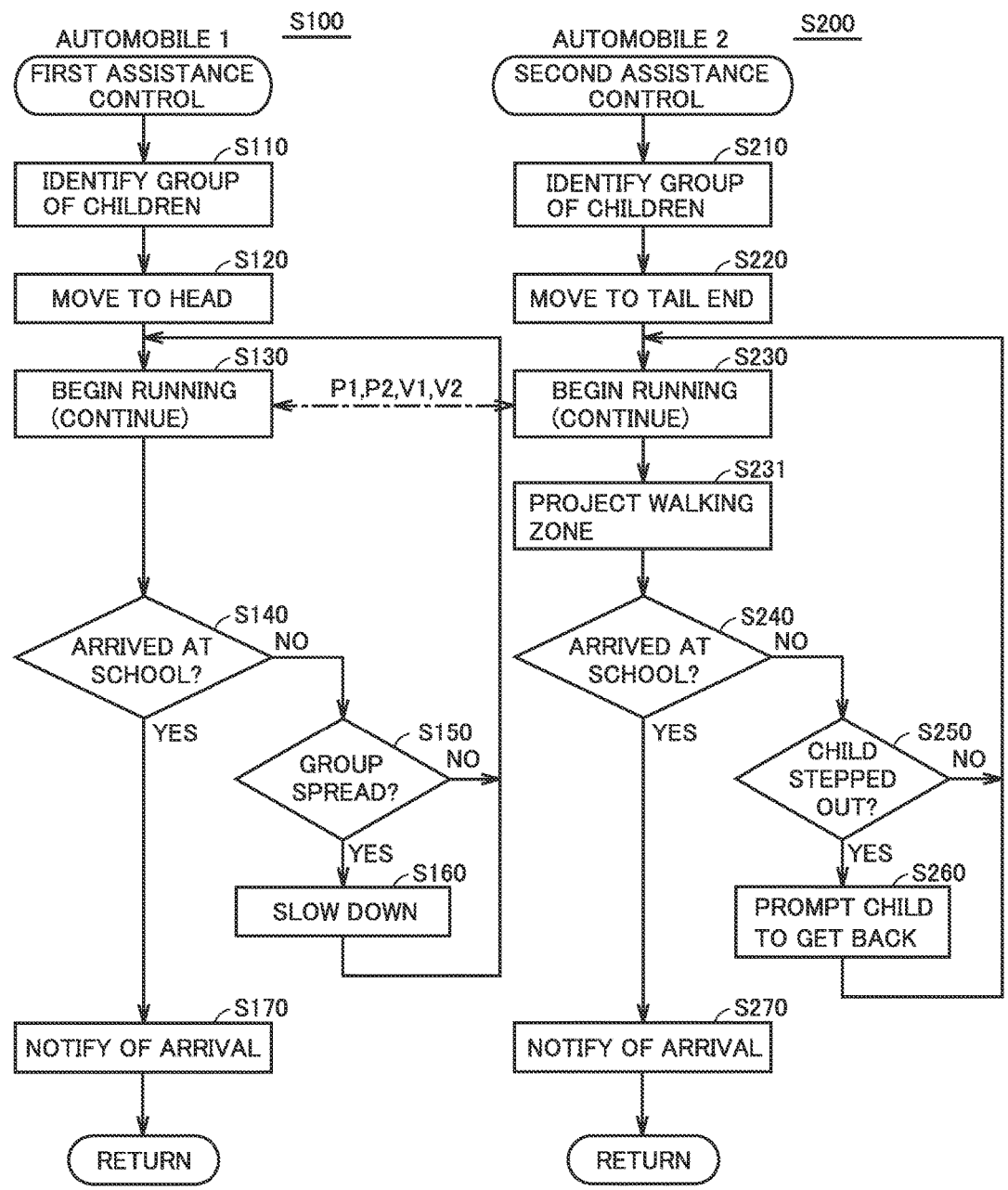
FIG. 7 is a flowchart for illustrating first and the second assistance controls.

FIGS. 6 and 7 each show a series of processing steps executed by ECU 101 included in automobile 1 on the left of the figure, and a series of processing steps executed by ECU 102 included in automobile 2 on the right of the figure. The processing steps are called from a main routine every given cycle and executed by ECUs 101 and 102 when, for example, automobiles 1 and 2 are in motion without carrying a user or when automobiles 1 and 2 are waiting at parking lots or the like.

Referring to FIGS. 2 and 6, at S11, ECU 101 determines whether the current time is within a predetermined time period in which children are on a way to school. The assistance control service may be appropriately provided as such in a period where users are required (need) to go to school in a group. If the current time is out of the predetermined time period (NO at S11), ECU 101 skips the subsequent processes and returns the processing to the main routine. Note that the information about the predetermined time period may be pre-stored in memory 100B included in ECU 101, or may be updated, as appropriate, through communications with server 31.

When the current time is within the predetermined time period (YES at S11), ECU 101 communicates with server 31 and thereby obtains information indicating the location of the school (destination), information indicating a location where automobile 1 should wait on a school road for the group of children to come (e.g., a dispatch area or a meet-up location with children, such as in front of a house of a child) (S12). More specifically, ECU 101 causes communication module 70 to transmit information indicating the current location of automobile 1 to server 31. Based on the current location of automobile 1, server 31 transmits, for example, the destination information and dispatch area information nearby the current location of automobile 1 to ECU 101 via a communication device (not shown) included in server 31.

Note that the destination information and the dispatch area information can be registered with assistance center 3 through a pre-procedure by the school or parents of the children. However, the dispatch area may be determined by referring to a past travel history. When a child is carrying a handheld device (such as smartphones not shown), a dispatch area suited for automobile 1 to join together with the group of children can be determined by obtaining GPS information of the handheld device.

At S13, ECU 101 runs automobile 1 by the auto-driving (auto-transit) to the dispatch area obtained at S12. Similarly to automobile 1, automobile 2 also performs the processes S21 through S23 that are respectively corresponding to S11 through S13, and thereby automobile 2 goes to the same dispatch area as automobile 1. As such, automobiles 1 and 2 wait on the school road for children (meet up), allowing automobiles 1 and 2 and the group of users to smoothly join together.

As automobiles 1 and 2 arrive at the dispatch area, a pair of automobiles (automobiles 1 and 2) which cooperatively provide the first and the second assistance controls (described below) are identified by intercommunications therebetween (in other words, automobiles 1 and 2 are paired to be associated with each other) (S14, S24). For example, ECU 101 included in automobile 1 can obtain identification information of automobile 2 from server 31 and perform processing to authenticate between automobile 1 and automobile 2 using the identification information. Instead of communicating, one automobile having arrived at the dispatch area may detect the other automobile by camera 81, and authenticate with the detected automobile.

At S15, ECU 101 included in automobile 1 waits for the group of children passing the perimeter of automobile 1 to be detected by camera 81 (NO at S15), and, when the group of children is detected in the perimeter of automobile 1 (YES at S15), ECU 101 performs control for asking whether the group of children wish to be assisted in going to school (S16). For example, ECU 101 displays a message on display 61, and receives touch panel operations made by the group of children (or their parents) in response to the message. Alternatively, ECU 101 may output a message via loudspeaker 62 and obtain a reply to the message via microphone 63.

If the group of children wishes to be assisted in going to school (YES at S17), ECU 101 performs the first assistance control (S100). ECU 101 also notifies ECU 102 included in automobile 2 that the assistance of children in going to school is requested. As a result, ECU 102 performs the second assistance control (S200). Note that when the group of children does not wish to be assisted in going to school (NO at S17), the processing returns to S15, and automobiles 1 and 2 wait for another group of children to be detected by camera 81. Note that while the description has been given that the processes from S15 through S17 are performed by automobile 1 with reference to FIG. 6, these processes may be performed by automobile 2.

FIG. 7 is a flowchart for illustrating the first and second assistance controls. The first assistance control performed by automobile 1 is shown on the left of the figure, and the second assistance control performed by automobile 2 is shown on the right of the figure. Note that control encompassing the first and the second assistance controls corresponds to "assistance control" according to the present disclosure.

Referring to FIGS. 2 and 7, at S110, once ECU 101 included in automobile 1 identifies the group of children by camera 81, ECU 101 moves automobile 1 to the front (head) of the group of children (S120). Meanwhile, when ECU 102 included in automobile 2 identifies the group of children by camera 81 (S210), ECU 102 moves automobile 2 behind (to the tail end of) the group of children (S220).

Upon completion of the movements of automobiles 1 and 2, ECU 101 begins running automobile 1 to a school (destination) (S130). Similarly, ECU 102 also begins running automobile 2 to the school (S230). In other words, automobile 1 and automobile 2 begin traveling to the school, having the group of children placed therebetween (or, if automobiles 1 and 2 are already in motion, they continue to travel). Automobile 1 detects the group of children by camera 81. Automobile 2 may detect the group of children, using its own camera 81, or may obtain an image captured by camera 81 included in automobile 1, through communications. Conversely, automobile 1 may obtain the image captured by camera 81 included in automobile 2, through communications.

Moreover, as described with reference to FIGS. 4A to 4C and FIGS. 5A and 5B, ECU 102 causes projector 50 to project, onto a ground surface, walking zone R indicating a recommended path for the group of children (S231). Note that while automobiles 1 and 2 are in motion, positional information (P1, P2) and the vehicle speed information (V1, V2) are exchanged and shared between automobile 1 and automobile 2, for example, every given cycle.

In the middle of traveling to the school (NO at S140), when ECU 101 determines that the group of children has spread in the direction of travel (YES at S150), ECU 101 slows down the automobile 1 (S1609). More specifically, as described with reference to FIG. 4B, when inter-vehicle spacing X found from positional information P1, P2 is greater than reference distance REF, ECU 101 reduces vehicle speed V1 lowers than when inter-vehicle spacing X is less than or equal to reference distance REF. This limits the walking speed of the preceding children, allowing the following children to catch up with the preceding children. Thus, spreading out of the group of users is solved.

Meanwhile, in the middle of traveling to a school (NO at S240), when ECU 102 detects that one of children has stepped out of walking zone R (YES at S250), ECU 102 causes loudspeaker 62 to output an audio message prompting the child to get back within walking zone R (S260). This allows all children to go to school while staying within walking zone R.

Then, upon arrival at the school (YES at S140, YES at S240), automobiles 1 and 2 (or may be either one of them) notifies the children of the arrival at the school, using an audio output through loudspeaker 62 (S170, S270). This completes the series of processing steps, and the processing returns to the main routine. Although not shown, automobiles 1 and 2 may thereafter go back to the original parking locations or may start another travel-around route, for example.

As described above, according to the present embodiment, in the situation where a group of children is going to school, the group is placed in between automobiles 1 and 2. Then, automobile 1 appropriately adjusts the speed of automobile 1 (while slowing down) while automobile 2 is projecting a recommended walking zone R on the road surface. This allows the group of children to safely and securely move to the school that is the destination. Thus, the movement of the group of children (going to and from school) can be assisted appropriately.

While the embodiment according to the present disclosure has been described above, the embodiment presently disclosed should be considered in all aspects illustrative and not restrictive. The scope of the present disclosure is indicated by the appended claims, and all changes that come within the scope of the claims and the meaning and range of equivalency of the claims are intended to be embraced within their scope.

What is claimed is:

1. A movement assistance system for assisting movement of a group including a plurality of users, the movement assistance system comprising:
 a first vehicle and a second vehicle each configured to perform auto-driving,
 at least one of the first vehicle and the second vehicle including a detection device configured to detect the group,
 the first vehicle and the second vehicle being configured to perform assistance control in which the first vehicle and the second vehicle cooperatively assist the movement of the group,
 the assistance control being control of assisting the movement of the group by the first vehicle traveling in front of the group and the second vehicle traveling behind the group, and wherein
 the first vehicle and the second vehicle perform the assistance control when a current time is within a predetermined time period for the movement of the group.

2. The movement assistance system according to claim 1, wherein the first vehicle and the second vehicle include transceivers, and the first vehicle and the second vehicle perform the assistance control by communicating with each other through the transceivers.

3. The movement assistance system according to claim 1, wherein the first vehicle and the second vehicle each further include an information acquisition device configured to obtain current location information and obtain information about a path of the movement of the group, and as the current time enters the predetermined time period, the first vehicle and the second vehicle travel to the path of the movement of the group and perform the assistance control.

4. The movement assistance system according to claim 1, wherein
 when a distance between the first vehicle and the second vehicle is greater than a given distance, the first vehicle reduces a travel speed of the first vehicle lower than when the distance is shorter than the given distance.

5. The movement assistance system according to claim 1, wherein the second vehicle further includes a notification device configured to notify the group of a walking zone on a path of the movement of the group.

6. The movement assistance system according to claim 5, wherein the notification device includes a projector configured to project the walking zone onto a road surface.

7. The movement assistance system according to claim 6, wherein
 the second vehicle causes the projector to modify a shape of the walking zone projected on the road surface according to a condition of the path of the movement of the group.

8. A movement assistance method for assisting movement of a group including a plurality of users, using a first vehicle and a second vehicle,
 the first vehicle and the second vehicle being configured to perform auto-driving,
 at least one of the first vehicle and the second vehicle being configured to detect the group,
 the movement assistance method comprising:
 detecting the group, by at least one of the first vehicle and the second vehicle; and assisting the movement of the group by the first vehicle and the second vehicle cooperating with each other, the first vehicle traveling in front of the group and the second vehicle traveling behind the group, wherein
 the first vehicle and the second vehicle perform assisting the movement of the group when a current time is within a predetermined time period for the movement of the group.

\* \* \* \* \*